(12) United States Patent
Hallee

(10) Patent No.: US 6,796,045 B2
(45) Date of Patent: Sep. 28, 2004

(54) LEVEL WITH RETRACTABLE HANGER STRUCTURE

(75) Inventor: Kristofor Milton Hallee, West Hartford, CT (US)

(73) Assignee: The Stanley Works, New Britain, CT (US)

( * ) Notice: Subject to any disclaimer, the term of this patent is extended or adjusted under 35 U.S.C. 154(b) by 0 days.

(21) Appl. No.: 10/183,026

(22) Filed: Jun. 27, 2002

(65) Prior Publication Data

US 2004/0000063 A1 Jan. 1, 2004

(51) Int. Cl.⁷ .................................................. G01C 9/26
(52) U.S. Cl. ........................................ 33/374; 33/370
(58) Field of Search ........................ 33/370, 371, 374, 33/375, 376

(56) References Cited

U.S. PATENT DOCUMENTS

| | | | | |
|---|---|---|---|---|
| 1,855,394 A | * | 4/1932 | Hill | 33/374 |
| 2,570,430 A | * | 10/1951 | Cramer | 33/342 |
| 2,667,704 A | * | 2/1954 | Dunn | 33/374 |
| 2,743,528 A | * | 5/1956 | Posthauer, Sr. | 33/375 |
| 3,740,858 A | | 6/1973 | Ostrager | 33/369 |
| 3,889,353 A | | 6/1975 | Provi | |
| 3,921,306 A | | 11/1975 | Provi | |
| 4,607,437 A | * | 8/1986 | McSorley et al. | 33/374 |
| 4,843,724 A | | 7/1989 | Greenland | |
| 4,976,040 A | | 12/1990 | Mish et al. | |
| 4,991,303 A | | 2/1991 | Marth et al. | |
| 5,044,087 A | | 9/1991 | McAuslin | 33/369 |
| 5,406,714 A | | 4/1995 | Baker et al. | |
| 5,412,876 A | | 5/1995 | Scheyer | |
| 5,442,864 A | * | 8/1995 | Erman | 33/376 |
| 5,479,717 A | | 1/1996 | Von Wedemeyer | |
| 5,617,641 A | | 4/1997 | Aarhus | |
| 5,940,978 A | | 8/1999 | Wright et al. | 33/381 |
| 6,131,298 A | | 10/2000 | McKinney et al. | |
| 6,205,669 B1 | | 3/2001 | Sollars et al. | |
| D440,507 S | | 4/2001 | Krehel et al. | |
| 6,279,240 B1 | | 8/2001 | Bonaventura et al. | |
| 6,442,853 B1 | * | 9/2002 | Hale et al. | 33/194 |

FOREIGN PATENT DOCUMENTS

WO WO91/15734 10/1991

* cited by examiner

*Primary Examiner*—Christopher W. Fulton
(74) *Attorney, Agent, or Firm*—Pillsbury Winthrop LLP

(57) ABSTRACT

The present invention provides a level including an elongated level body defining an exterior workpiece contacting surface thereon. A hanger structure is movably connected to the level body so as to be capable of being moved between a retracted position and a deployed position. The hanger structure includes a contacting surface thereon that, when the hanger structure is in the deployed position, is disposed outwardly from the level body to be engageable with a support surface and thereby enable the level to be hung.

28 Claims, 7 Drawing Sheets

LEVEL WITH RETRACTABLE HANGER STRUCTURE

BACKGROUND OF THE INVENTION

1. Field of the Invention

The present invention relates to levels and, more particularly, to a level with a hanger structure.

2. Description of Related Art

Levels, such as the type used in construction projects, usually include one or more vial assemblies that allow a user to determine an orientation of a work surface. The vial assemblies generally include a transparent, e.g., glass, tube partially filled with a liquid. The vial assemblies, therefore, tend to be somewhat fragile. Additionally, it is typically desirable for a level to be substantially straight and to include at least one surface thereon that is substantially straight and planar in order for the level to properly determine when an abutting surface of a workpiece is disposed in a level or other orientation. For these reasons, care must be taken to prevent damaging the vial assemblies and/or warping the level.

Electronic levels that do not contain vial assemblies are also known in the art. Although electronic levels do not contain vial assemblies, they may be damaged in many of the same ways as conventional levels.

Both electronic and conventional levels are typically provided with one or more apertures therein configured to allow the level to be suspended in a relatively secure manner (e.g., hung on a nail, screw, or other hanging element) when storing or temporarily setting the level aside. If a level is not suspended from a hanging element, it may be placed on a horizontal surface (such as a shelf, workbench, or sawhorse) when not in use, from which it may be inadvertently knocked off and damaged during subsequent work.

However, it is not always desirable, or possible, to attach a hanging element to a structure so as to suspend the level therefrom when not in use. For example, when the user is working with a finished product, attaching a hanging element to the finished product may mar the surface thereof. In addition, a hanging element projecting from a particular structure may interfere with other objects or work spaces. Furthermore, when moving around a worksite, it is generally impractical and inconvenient to attach a fastening element at each location at which the level is used in order to hang the level. However, the need remains to provide a convenient and secure manner in which to store or temporarily set the level aside.

SUMMARY OF THE INVENTION

It is one aspect of the present invention to provide a level with a hanger structure that allows the level to be hung on a support surface.

It is another aspect of the present invention to provide a level with a hanger structure that is attached to the level itself.

It is another aspect of the present invention to provide a level with a hanger structure attached thereto that is movable into a position wherein the hanger structure extends outwardly from the level.

One embodiment of the present invention provides a level including an elongated level body defining an exterior workpiece contacting surface thereon. At least one plumb and/or level measuring element is carried by the body. A hanger structure is movably connected to the level body so as to be capable of being moved between a retracted position and a deployed position. The hanger structure includes a contacting surface thereon that, when the hanger structure is in the deployed position, is disposed outwardly from the level body to be engageable with a support surface and thereby enable the level to be hung.

One other embodiment of the present invention provides a method of using a level. The method includes moving a hanger structure from a retracted position to a deployed position. The hanger structure including a contacting surface thereon disposed outwardly of the level body when the hanger structure is in the deployed position. The method also including hanging the level by engaging the contacting surface with a support surface.

Yet another embodiment of the present invention provides a method of making a level. The method includes providing a level body having a recess therein. A hanger is connected to the level body at the recess to enable the hanger to be moved into and out of the recess. The hanger enables the level to be hung when moved out of the recess.

DETAILED DESCRIPTION OF ILLUSTRATED EMBODIMENTS OF THE INVENTION

Figure 1:
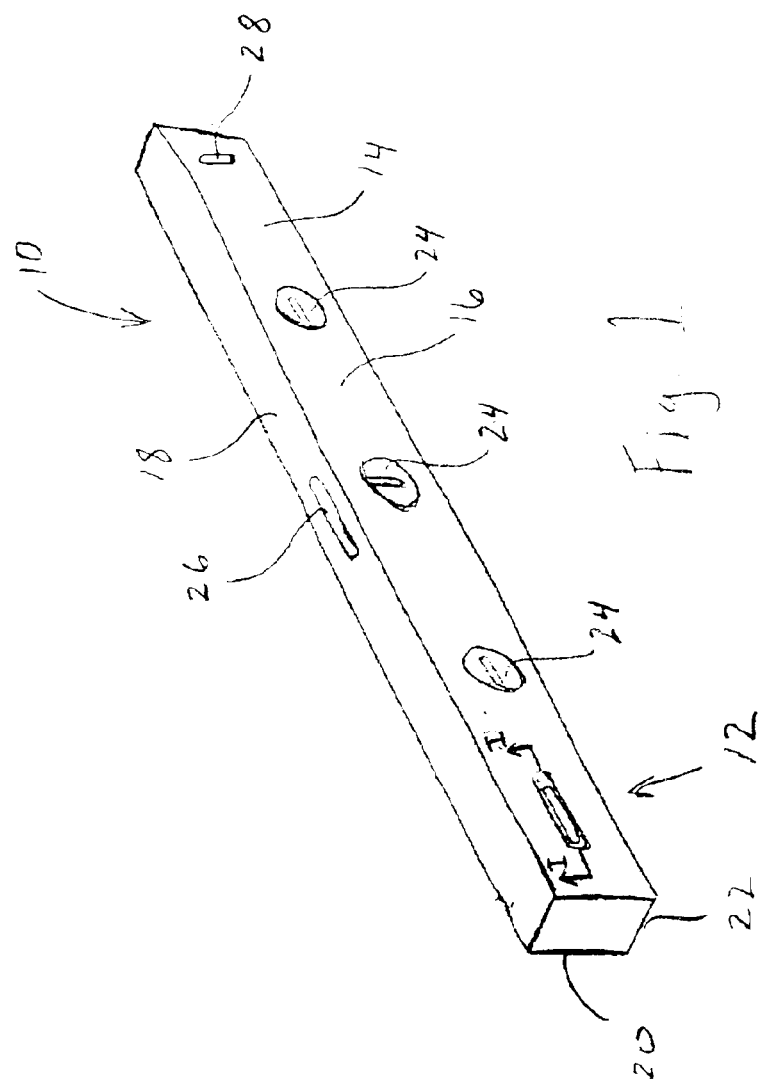
FIG. 1 is a perspective view of a level according to principles of the present invention.

FIG. 1 shows a level 10 embodying principles of the present invention including a retractable hanger structure 12 mounted thereon. The level 10 has an elongated level body 14 which is shown as having a rectangular cross-sectional configuration. The level body 14 is formed of wood, however, it may be formed of any suitable material, and may have any suitable configuration. The level body 14 provides workpiece contacting surfaces 16, 18 and 20, 22 on corresponding sides thereof. As shown, the workpiece contacting surfaces 16, 20 are defined by an opposing pair of broad faces of the level body 14 and the workpiece contacting surfaces 18, 22 are defined by an opposing pair of narrow faces of the level body 14. To facilitate use of the level 10, opposing pairs of workpiece contacting surfaces 16, 20 and 18, 22 are generally formed to be parallel to one another, while adjacent pairs of workpiece contacting surfaces 16, 18 and 20, 22 are generally formed to be perpendicular to one another. Additionally, the level body 14 carries one or more level and/or plumb measuring instruments 24, 26. In the preferred embodiment, the measuring instruments are liquid filled vial assemblies 24, 26. In such embodiment, openings extend through the level body 14 for receiving the vial assemblies 24, 26 therein. The vial assemblies 24, 26 allow a user of the level 10 to visually determine when the level 10 is disposed in a level orientation. As shown, the vial assemblies 24 face outwardly from the workpiece contacting surfaces 16, 20 while the vial assembly 26 faces outwardly from the workpiece contacting surface 18. However, it is, of course, possible to provide any number of vial assemblies at any desired orientation. The vial assemblies can be mounted to the body in any manner as would be appreciated by those skilled in the art. Alternatively, the level may employ electronically-based plumb measuring instruments 24, 26, and thus, may not include traditional vial assemblies.

As also shown, the level body 14 may be formed with an aperture 28 that extends at least partially therethrough to allow the level 10 to be suspended from, e.g., a nail or hook. Of course, the level 10 may or may not include such aperture 28.

Figure 2:
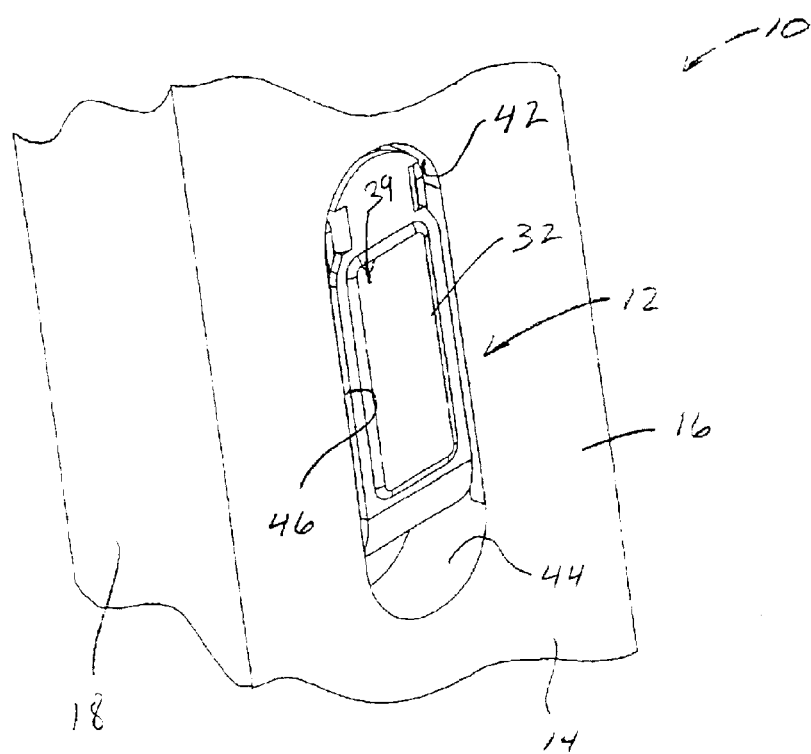
FIG. 2 is a partial perspective view of the level of FIG. 1 showing a hanger structure in a retracted position.

The hanger structure 12 is shown in FIGS. 1 and 2 in a closed, or retracted, position, preferably such that an outermost surface of the hanger structure 12 is disposed either substantially flush with or interiorly of the workpiece contacting surface 16. Accordingly, the hanger structure 12, when in the retracted position, will not interfere with the abutment of level 10 against a workpiece surface. Additionally, the hanger structure 12 may be retracted so as to allow the level 10 to be packaged or placed in a protective case.

Figure 4:
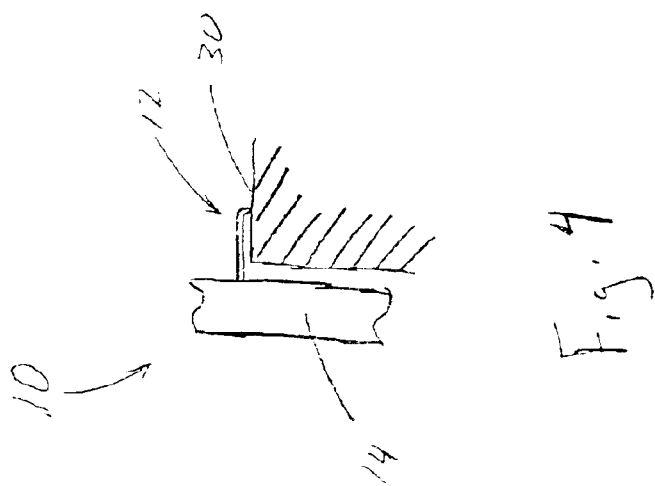
FIG. 4 is a side view of the level of FIG. 1 with the hanger structure in the deployed position and supporting the level on a support surface.
Figure 3:
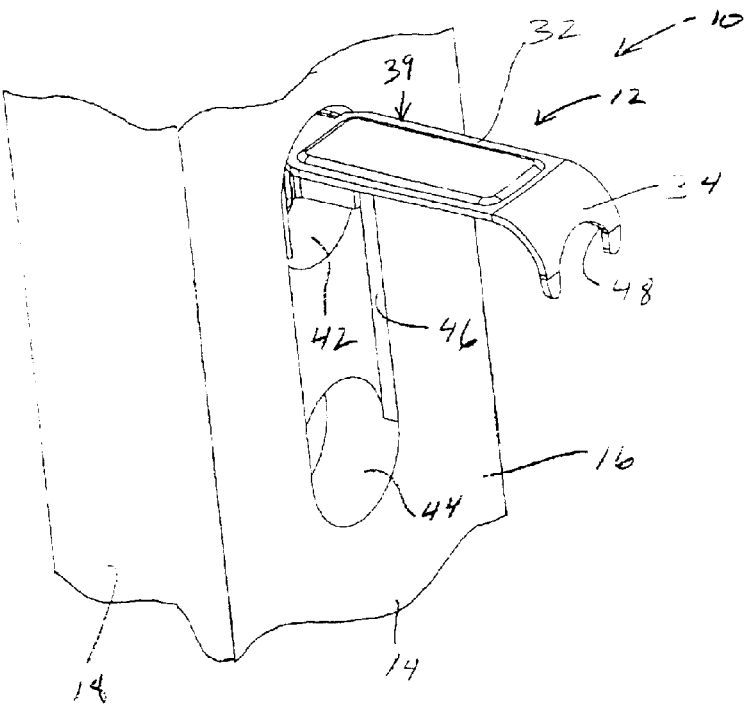
FIG. 3 is a partial perspective view of the level of FIG. 1 showing a hanger structure in a deployed position.

The hanger structure 12 is also movable into an open or extended position (which may also be referred to as a deployed position), as shown in FIG. 3. In the extended position thereof, the hanger structure 12 extends outwardly from the level body 14 past the workpiece contacting surface 16. It may be preferable for the hanger structure 12, when in the extended position, to be oriented generally perpendicularly to the level body 14. Referring to FIG. 4, the level 10 may be suspended by the hanger structure 12, when the hanger structure 12 is in its extended position, on a support surface, indicated at 30. It is contemplated that the support surface 30 may be any surface on which the user suspends the level 10, such as a stud, rafter, beam, scaffolding, ladder, shelving, workpiece, unfinished wall etc. to store the level 10 in a hanging manner therefrom.

The hanger structure 12 is preferably formed of a metallic material, such as steel. Other metallic materials, such as aluminum, however, may alternatively be used. It is also contemplated that the hanger structure 12 may be formed of a suitably rigid wood, polymer or composite material.

Figure 5:
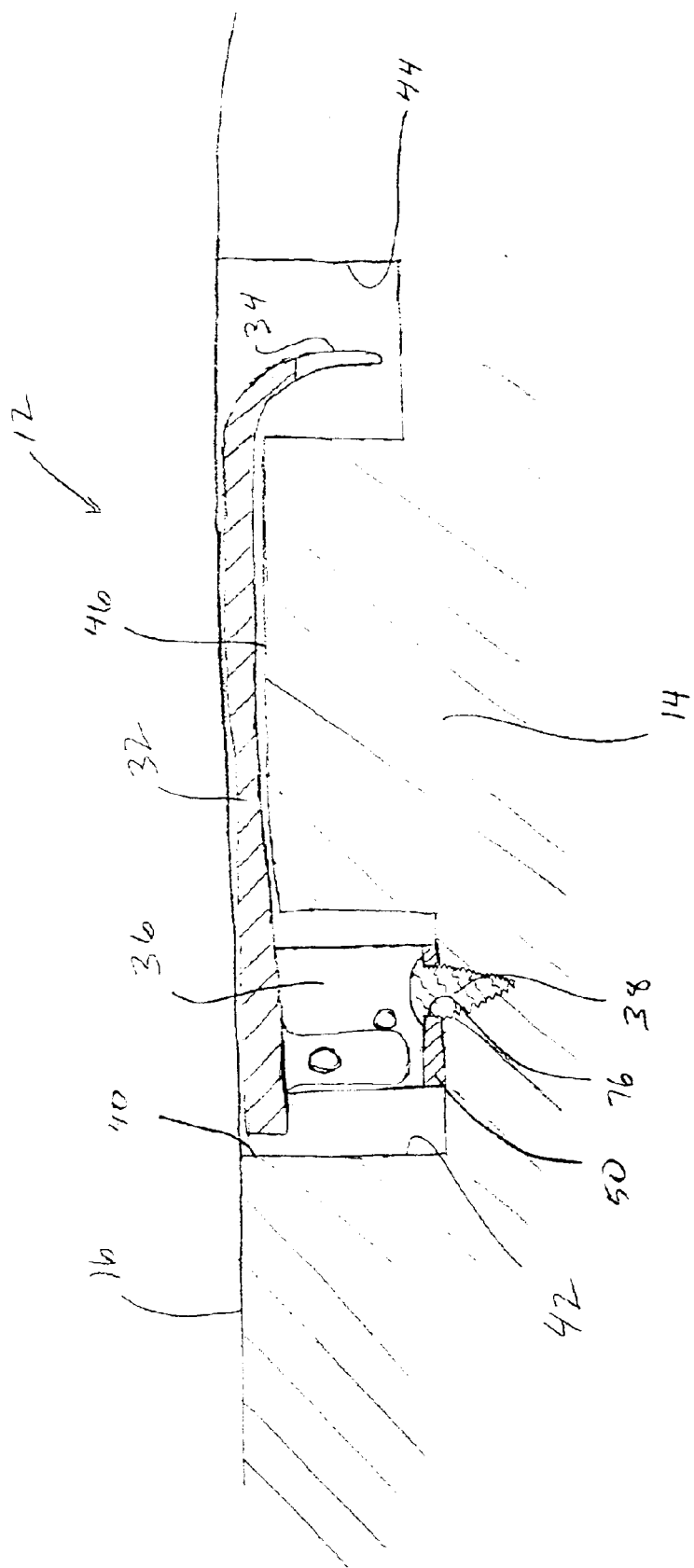
FIG. 5 is a cross-sectional view of the level and hanger structure taken along line I—I in FIG. 1.

As shown in FIG. 3, the hanger structure 12 includes an elongated body portion 32 that provides on one end thereof a contacting portion 34 and a support structures contacting surface 35. Referring to FIG. 5, an opposite end of the body portion 32 is pivotably connected to a mounting structure 36 of the hanger structure 12. The mounting structure 36 is, in turn, anchored to the level body 14 with a fastener 38, such as a screw or bolt. The body portion 32 may have identifying indicia. For example, a raised, embossed portion 39 is shown in FIGS. 2 and 3, on an exterior surface thereof. It is contemplated that the body portion 32 and mounting structure 36 may be formed by a stamping process. Other processes may, of course, be utilized.

In order to allow the hanger structure 12 to be seated interiorly of the workpiece contacting surface 16, there is preferably formed an outwardly open recess 40 within the level body 14 within which the hanger structure 12 is disposed. The recess 40 is preferably defined by a pair of spaced circular bores 42, 44 which are interconnected by a channel 46. It is contemplated that the channel 46 may be of any depth, such as a relatively shallow depth, as shown, or a depth generally equal to that of the bores 42, 44, such that recess 40 has a generally uniform depth. As shown in FIG. 5, the mounting structure 36 and corresponding end portion of the body portion 32 are disposed within the bore 42 and are fixed at a bottom portion of the bore 42 by the fastener 38. The contacting portion 34 is disposed within the bore 44 and the body portion 32 extends between the bores 42, 44 within the channel 46. Referring to FIG. 2, the bore 44 additionally facilitates extension of the hanger structure 12 by allowing the user to insert his/her finger therein to grip the contacting portion 34. Furthermore, the contacting portion 34 provides a U-shaped cutout 48 (best seen in FIG. 7) to facilitate gripping the contacting portion 34 when the hanger structure 12 is retracted.

Figure 6:
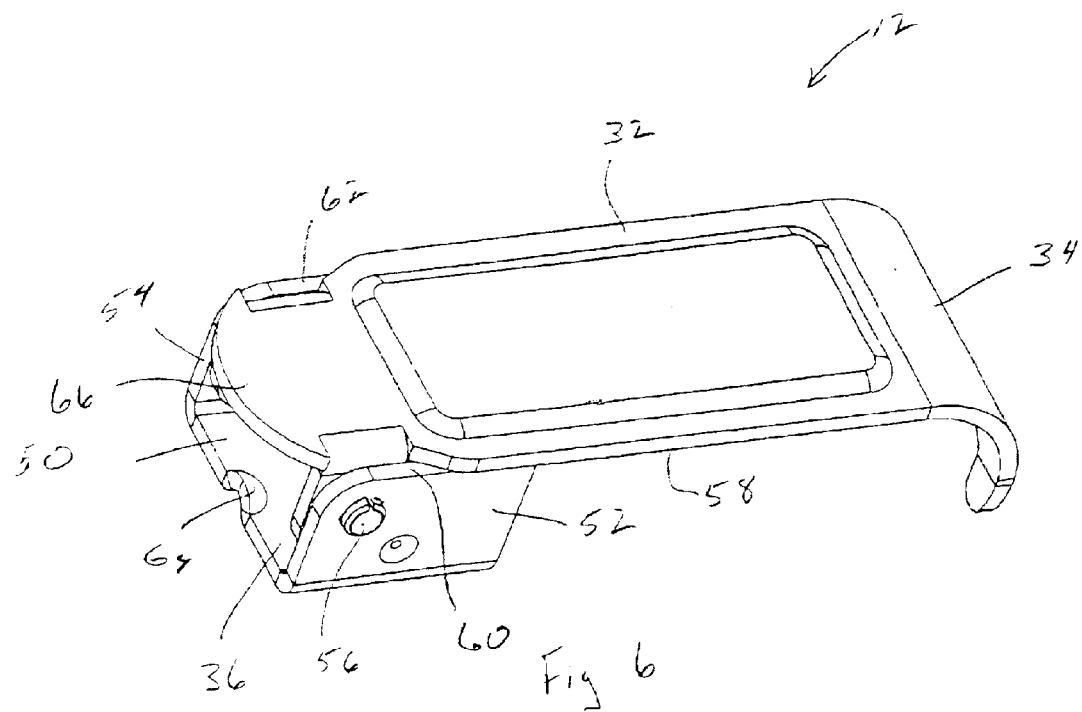
FIG. 6 is a perspective view of the hanger structure shown in the retracted position.
Figure 7:
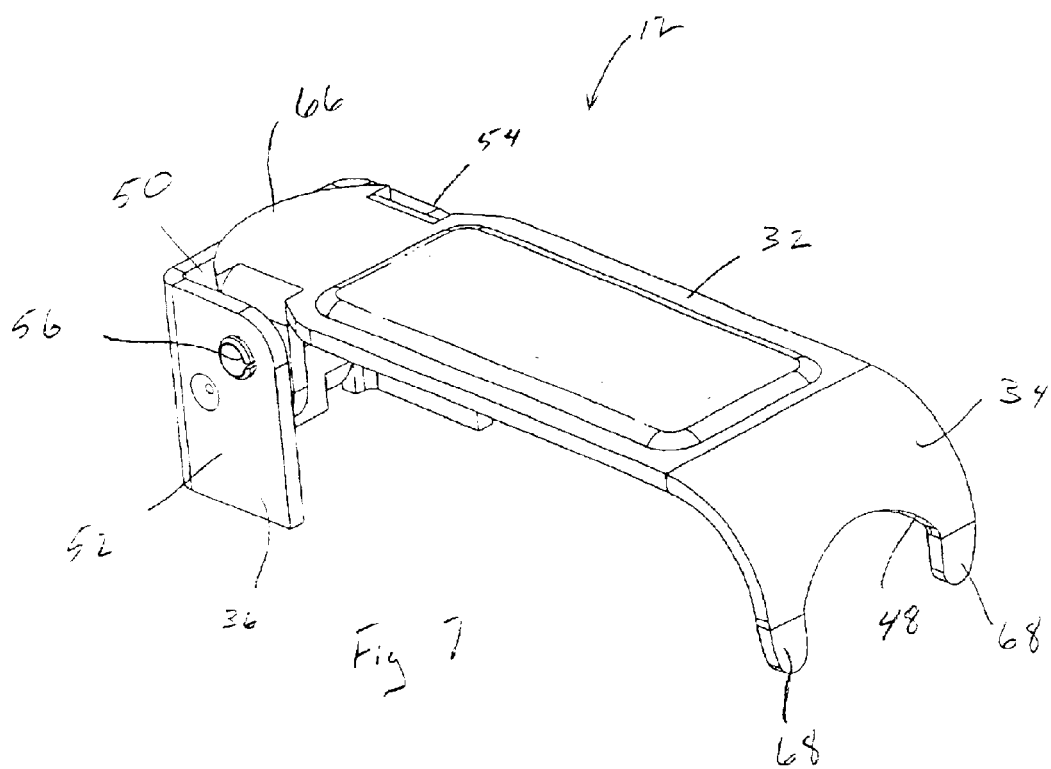
FIG. 7 is a perspective view of the hanger structure shown in the deployed position.

As shown in FIGS. 6 and 7, the mounting structure 36 includes a base portion 50 and a pair of spaced opposing upstanding side portions 52, 54. A shaft element 56 extends between the side portions 52, 54 and allows for pivotal movement of the body portion 32 relative to the mounting structure 36. FIG. 6 corresponds to the retracted position of the hanger structure 12 (also see FIG. 2). In this position, the body portion 32 of the hanger structure 12 extends generally parallel with the base portion 50 and side portions 52, 54 of the mounting structure 36. Additionally, an underside surface 58 of the body portion 32 abuts confronting surfaces 60, 62 of the side portions 52, 54, respectively, which prevents further movement past the retracted position, i.e., past parallel alignment with the base portion 50 and side portions 60, 62. In this manner, the body portion 32 is prevented from pivoting substantially below the workpiece contacting surface 16, which orientation may make the extraction of the hanger structure 12 from the recess 40 difficult.

FIG. 7 shows the hanger structure 12 in the extended position (also see FIG. 3), wherein the body portion 32 is oriented relatively perpendicularly to the base portion 50 and side portions 52, 54. In this position, a stop structure 64 (see FIG. 6) formed by a detent in the base portion 50, abuts an underside surface of an overhanging portion 66 of the body portion 32. The abutment of the overhanging portion 66 and stop structure 64 prevents the hanger structure 12 from moving past the extended position, i.e., past about 90° between the body portion 32 and base 50 and side portions 52, 54. Accordingly, the weight of the level 10 may be supported by the hanger structure 12.

As also shown in FIG. 7, the contacting portion 34 provides a pair of tapered depending finger portions 68 that, along with an arcuate portion extending therebetween, define the U-shaped cutout 48. When the hanger structure 12 is in the extended position and the level 10 is being supported on a support surface (such as shown in FIG. 4) the finger portions 68 serve to concentrate a weight of the level 10 in relatively small contact areas corresponding to tips of the finger portions 68. The concentration of the weight on these contact areas via the finger portions 68 serves to increase the amount of friction or grip the contacting portion 34 has with the support surface. Furthermore, due to the depending nature of the contacting portion 34, and especially the finger portions 68, the hanger structure 12 is able to partially surround narrow objects, such as pipes or ladder rungs, to facilitate support of the level 10 thereon. It is contemplated that a portion of the hanger structure 12, in particular the contacting portion 34 and more particularly the finger portions 68, may be over-molded with a polymer material to increase a coefficient of friction thereof and/or protect the support surface from possibly being damaged (e.g., scratched, etc.) by contact with the hanger structure 12. It should be appreciated that any surface on the hanger structure 12 that can engage a support structure when the hanger structures 12 is deployed to enable the level 10 to be hung (e.g., at the underside of the hanger structure 12 or at the tips of the hanger structure 12 as shown in FIG. 5) should be considered to be a support structure contacting surface 35 in accordance with this disclosure.

Figure 8:
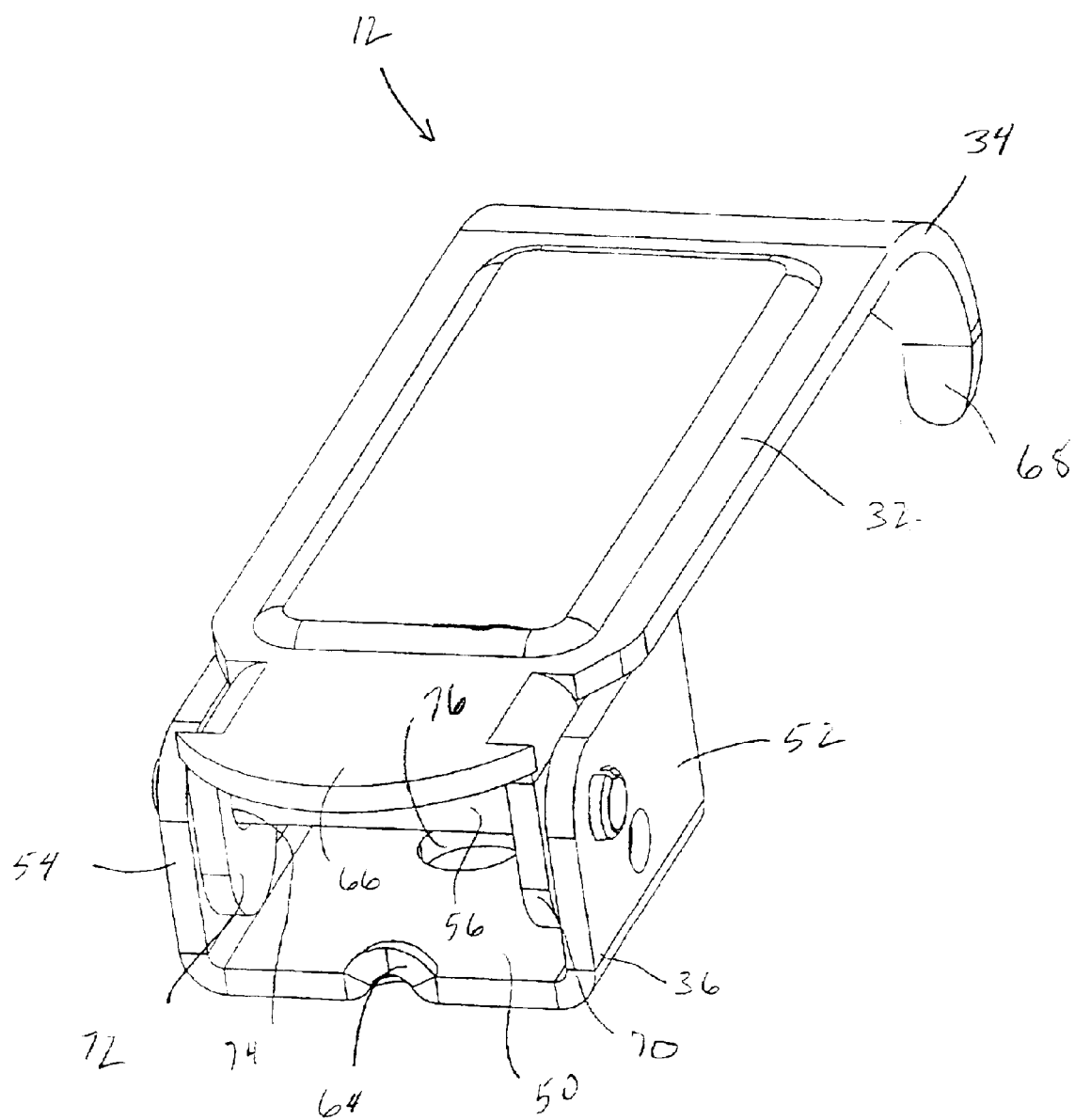
FIG. 8 is another perspective view of the hanger structure shown in retracted position.

FIG. 8 shows the hanger structure 12 in greater detail. As shown, the body portion 32 is formed with a pair of horizontally spaced depending leg portions 70, 72. The leg portions 70, 72 include openings 74 therein through which the shaft element 56 extends to allow the body portion 32 to be pivoted relative to the mounting structure 36. In particular, the leg portions 70, 72 may pivot on the shaft element 56 relative to the mounting structure 36 or the shaft element 56 may be fixedly mounted to the leg portions 70, 72, in which case the body portion 32 and shaft element 56 pivot relative to the mounting structure 36. Furthermore, as shown, the base portion 50 has formed therein an opening 76, which, referring back to FIG. 5, receives the fastener 38 therein to allow the mounting structure 36 to be secured to the level body 14.

Figure 9:
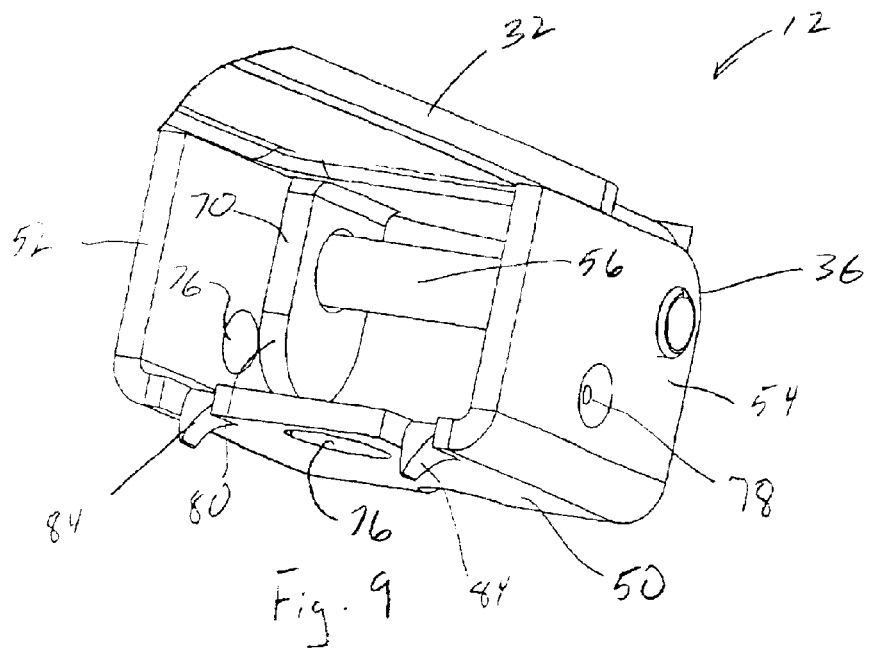
FIG. 9 is a partial perspective view of the hanger structure in the retracted position.
Figure 10:
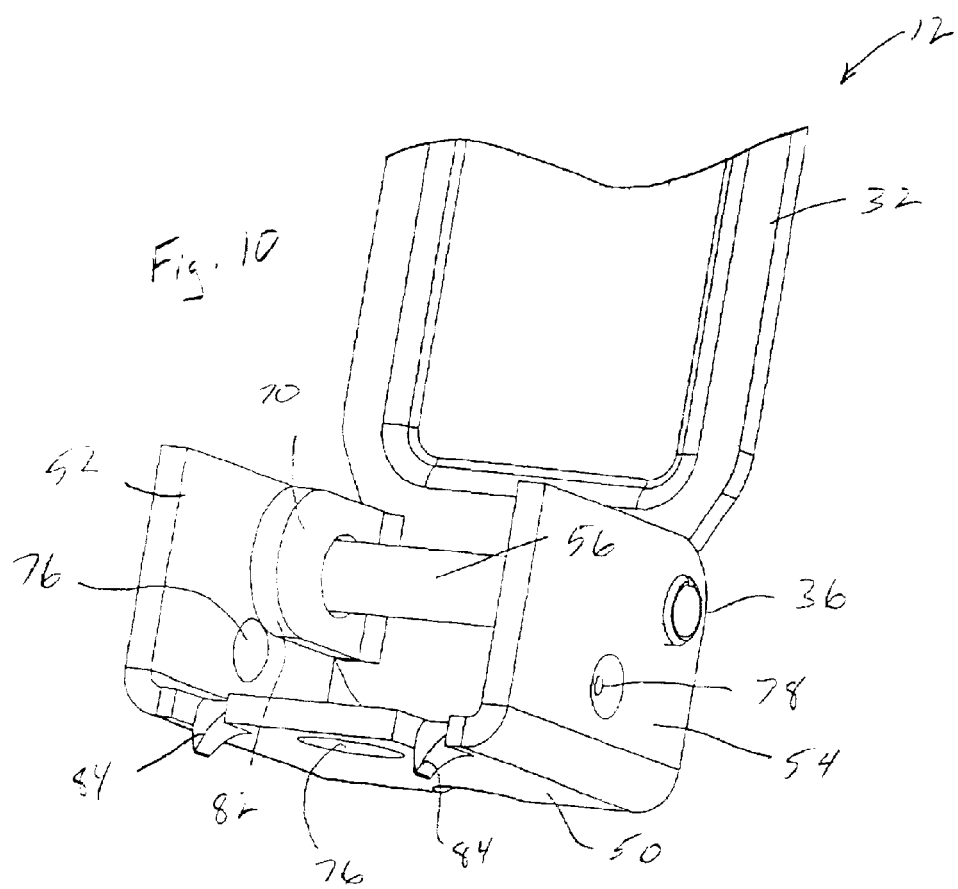
FIG. 10 is a partial perspective view of the hanger structure in the deployed position.

As shown in FIGS. 9 and 10, the side portions 52, 54 of the mounting structure 36 are each formed with a retaining element 76, 78. The retaining elements 76, 78 are formed by inwardly extending detents in the respective side portions 52, 54 of the mounting structure 36. Accordingly, the retaining elements 76, 78 are generally dome-like and extend inwardly from interior surfaces of the side portions 52, 54. FIG. 9 shows the hanger structure 12 in the retracted position. As shown, leading edge portions 80 of the leg portions 70, 72 abut a periphery of the corresponding retaining elements 76, 78. In order to effect pivotal movement of the body portion 32 out of the retracted position, a user must exert sufficient force on the body portion 32 such that the leg portions 70, 72 are deflected slightly inwardly by the retaining elements 76, 78 so as to pass thereover. In this manner, the body portion 32 is retained within the retracted position in a resilient manner so as to not be inadvertently moved out of the retracted position. Similarly, as shown in FIG. 10, when the hanger structure 12 is in the extended position thereof, trailing edge portions 82 of the leg portions 70, 72 abut peripheries of the retaining elements 76, 78 to thereby retain the body portion 32 in the extended position. In order to retract the hanger structure 12, the user must exert sufficient force on the body portion 32 to deflect the leg portions 70, 72 slightly inwardly over the retaining elements 76, 78. Accordingly, the hanger structure 12 is retained in the extended position thereof in a resilient manner so as to not be inadvertently moved out of the extended position.

As also shown in FIGS. 9 and 10, the base portion 50 is formed with a pair of downwardly extending retaining structures 84. The retaining structures 84 are pushed into the material of the level body 14 when the hanger structure 12 is fastened thereto. As shown, the retaining structures 84 may have a claw-like configuration or may be otherwise relatively sharp to facilitate piercing the material of the level body 14. However, it is also contemplated that the retaining structures 84 may, alternatively, be in the form of one or more tabs (not shown) that are received in corresponding apertures (not shown) within the level body 14. This latter configuration may be particularly desirable when the level body 14 is formed from a relatively hard material, such as metal, and retaining structures having a sharp configuration (such as shown in FIGS. 9 and 10) may be prevented from piercing into the material of the level body 14. In any case, however, the retaining structures 84 serve to limit the movement of the hanger structure 12 relative to the level body 14.

Figure 13:
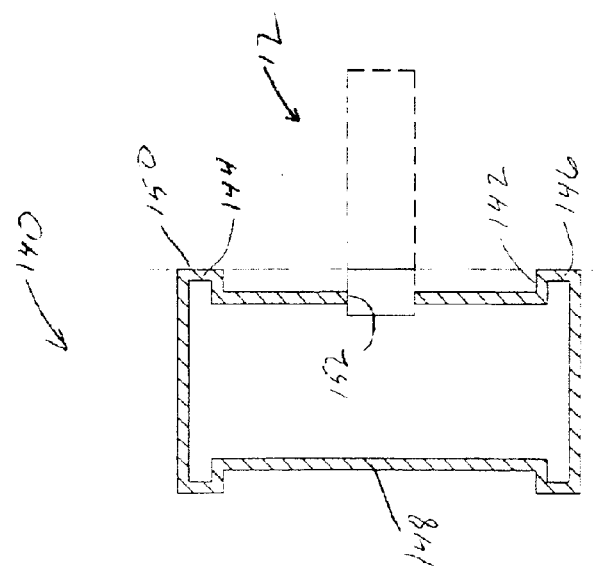
FIGS. 11–13 are other embodiments of levels including the hanger structure.
Figure 12:
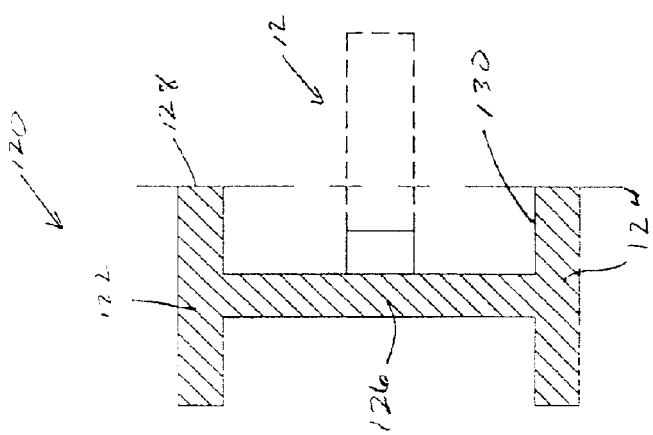
Figure 11:
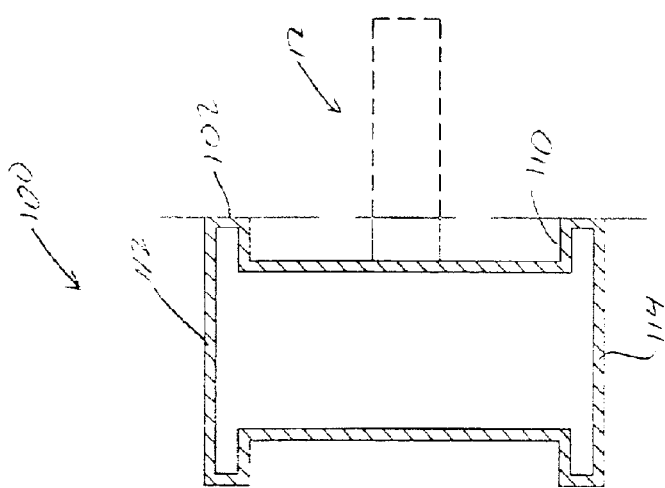
Figure 1:
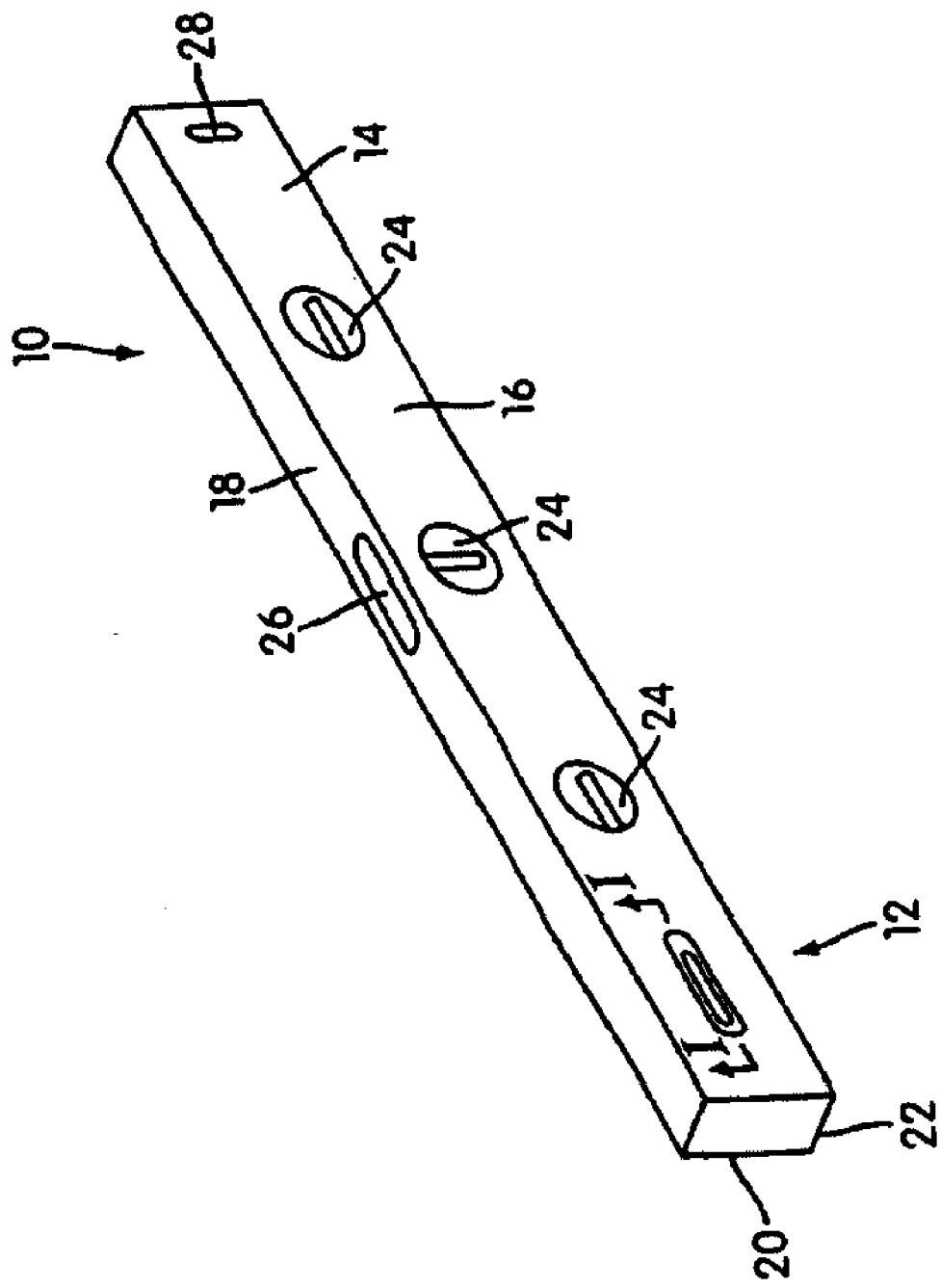
Figure 2:
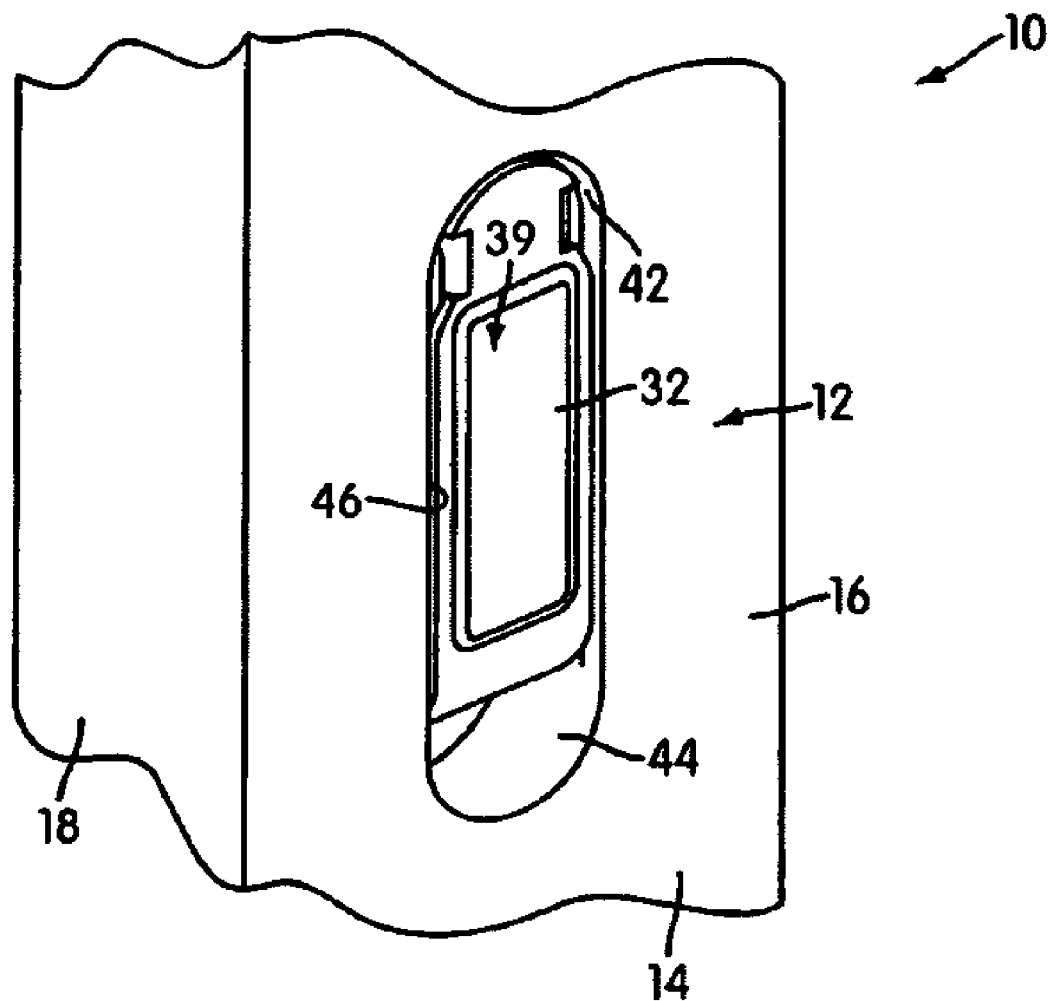
Figure 3:
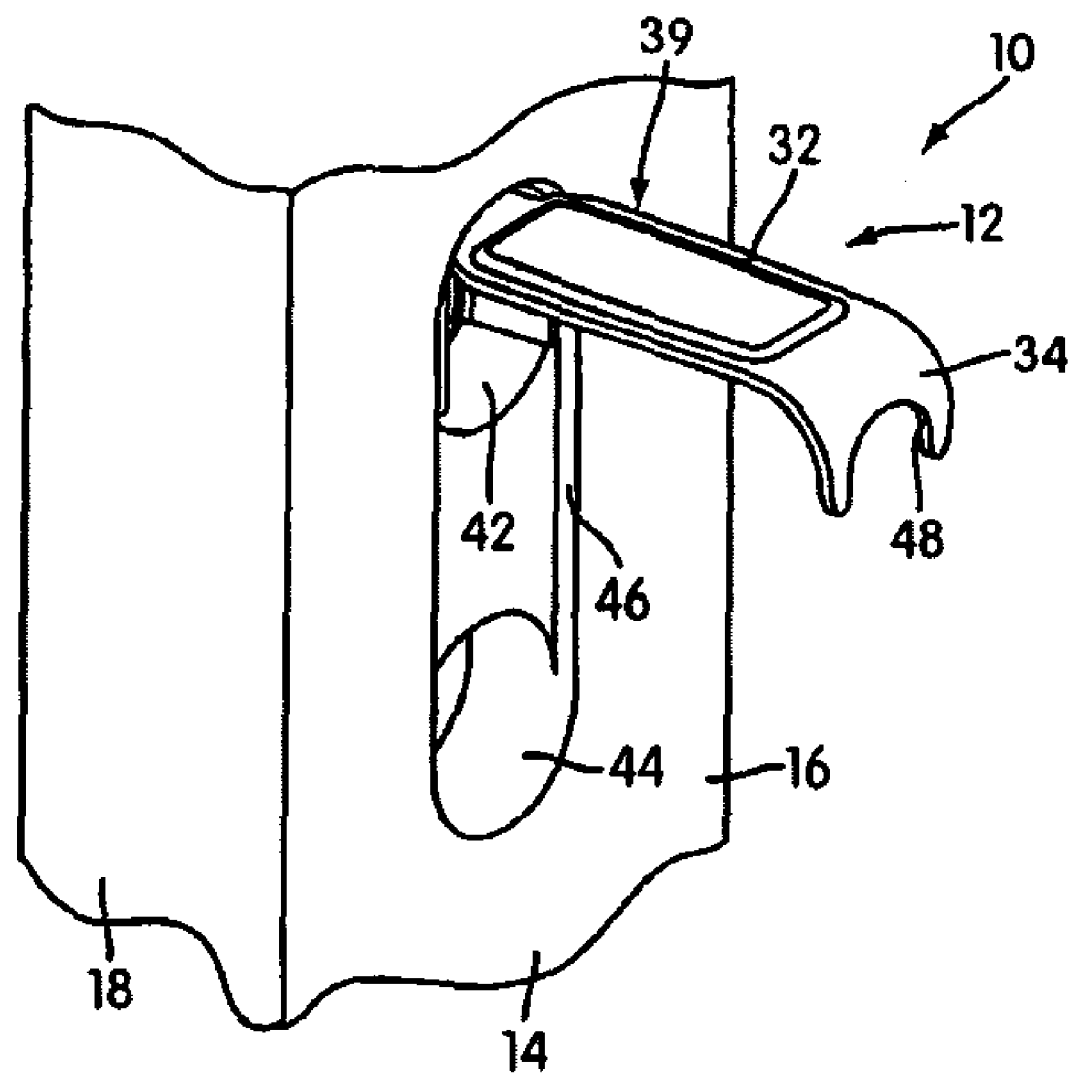
Figure 4:
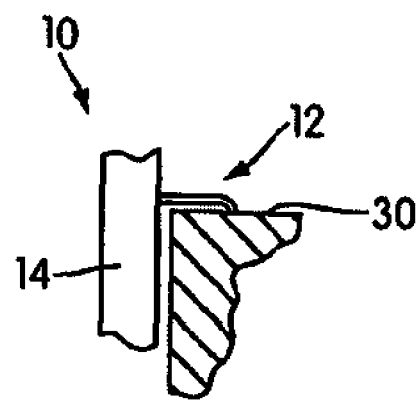
Figure 5:
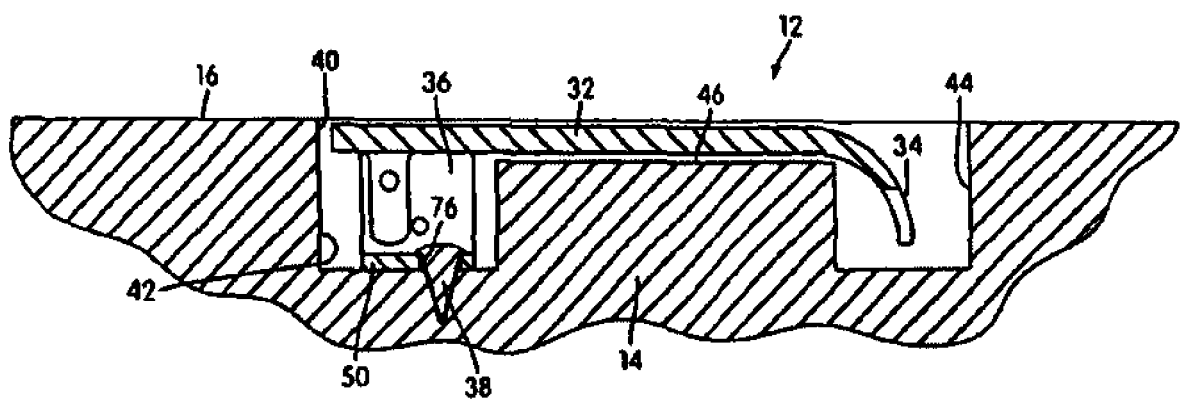
Figure 6:
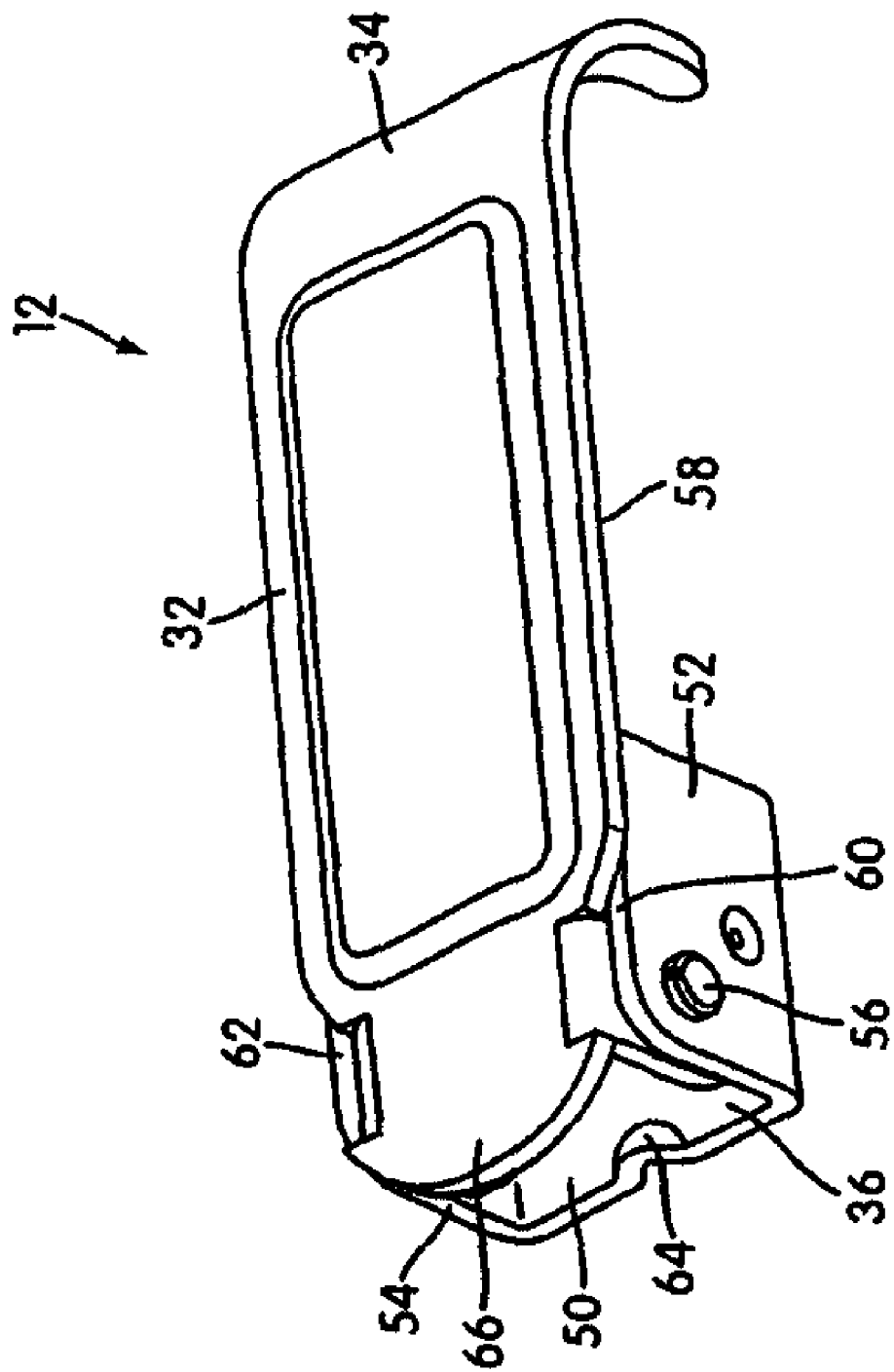
Figure 7:
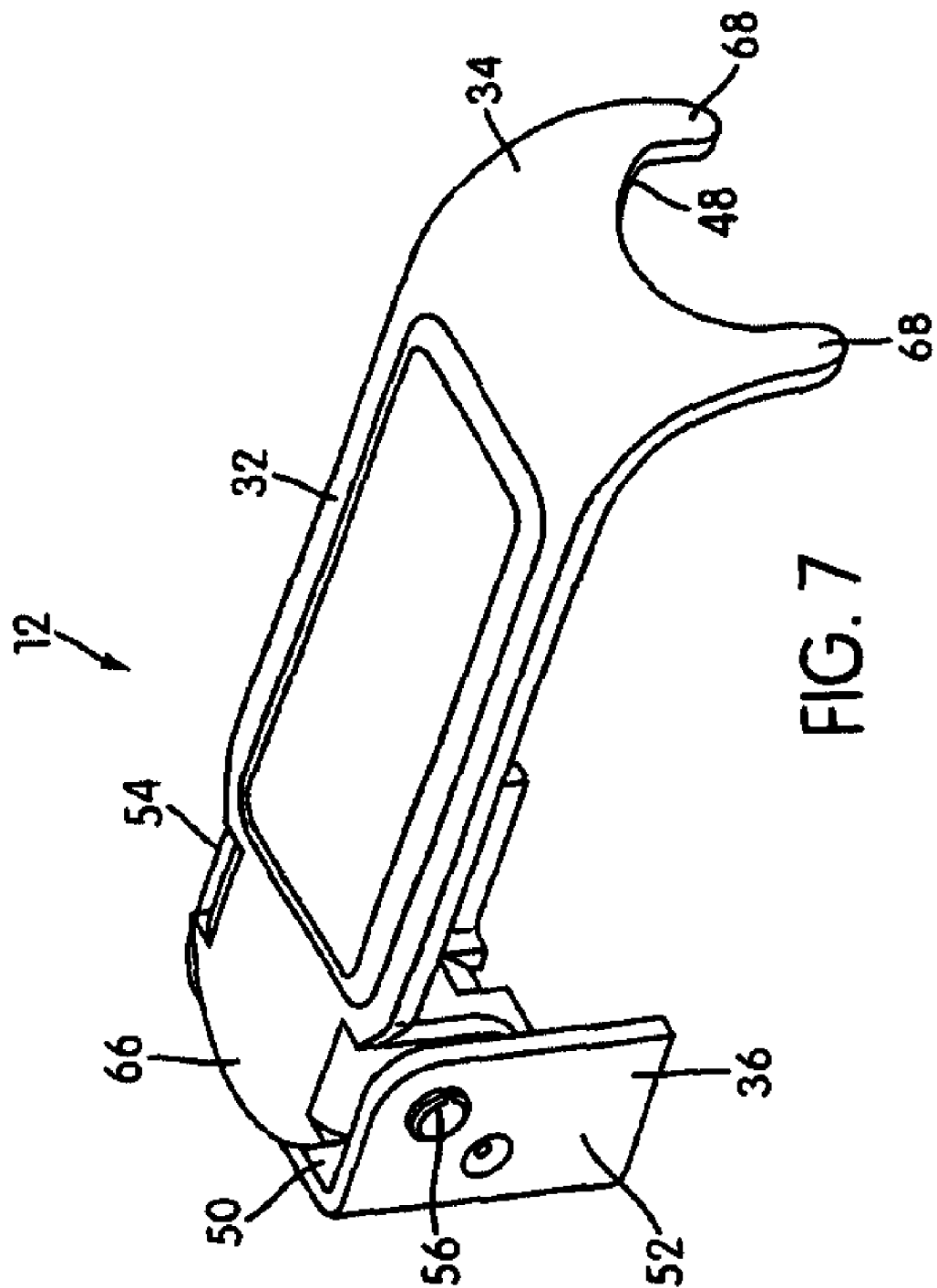
Figure 8:
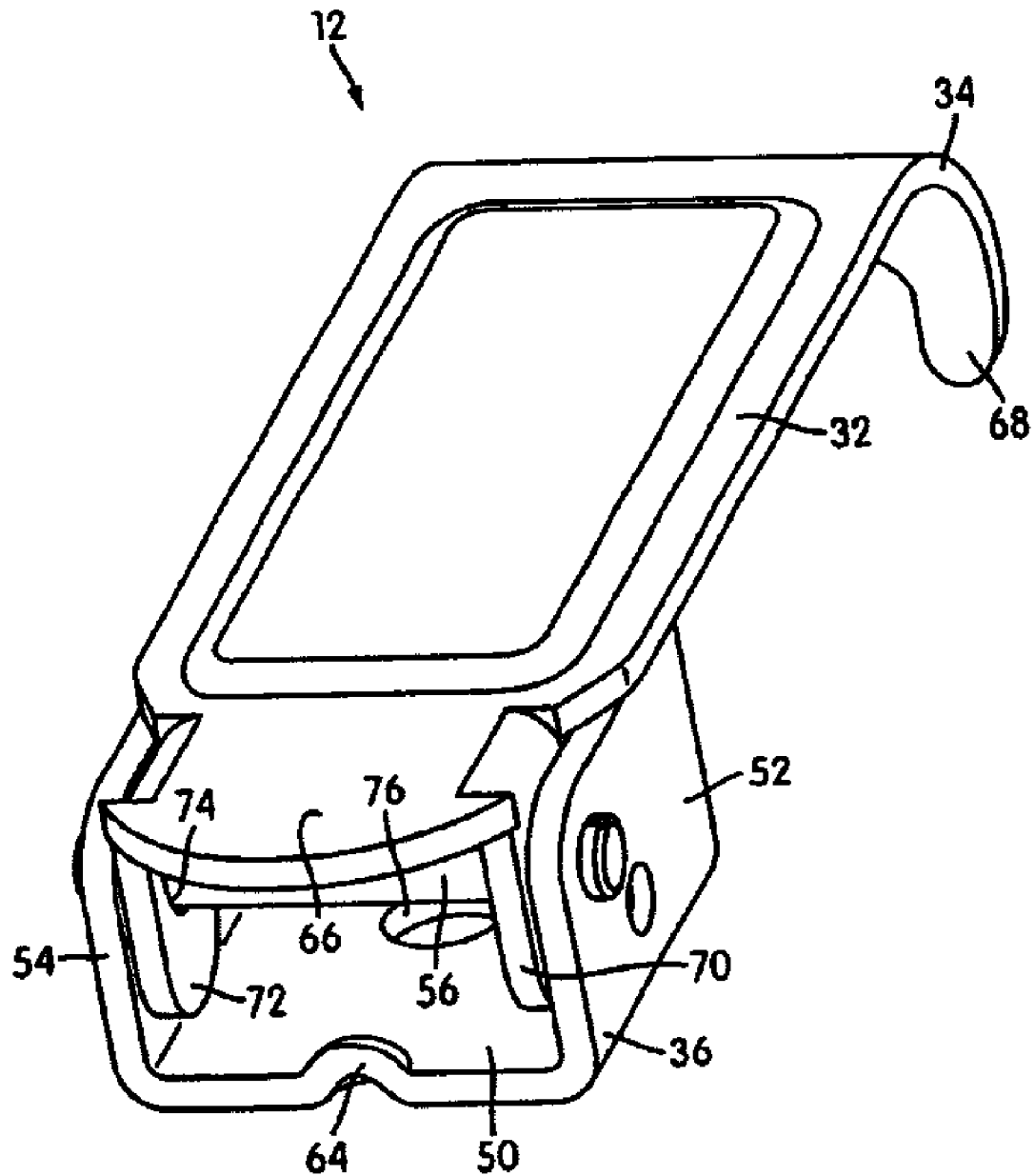
Figure 9:
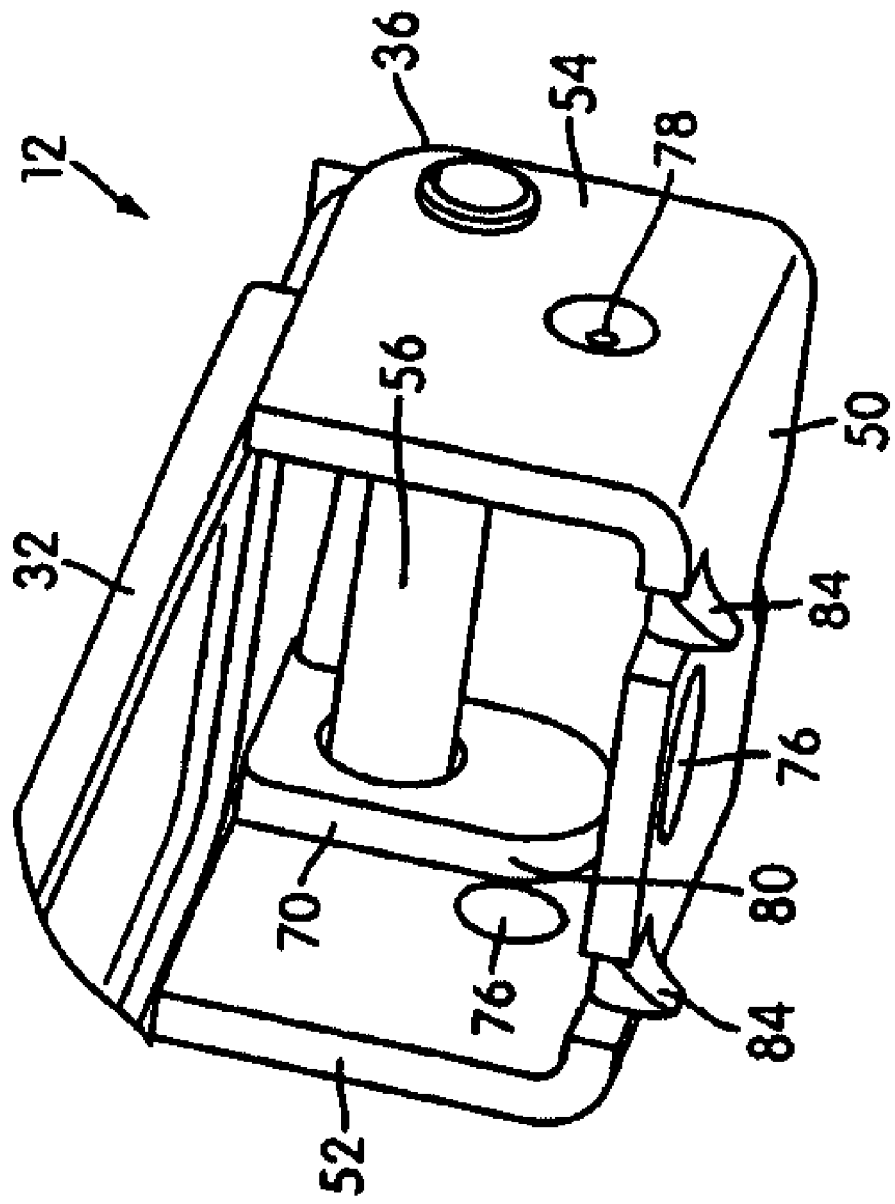
Figure 10:
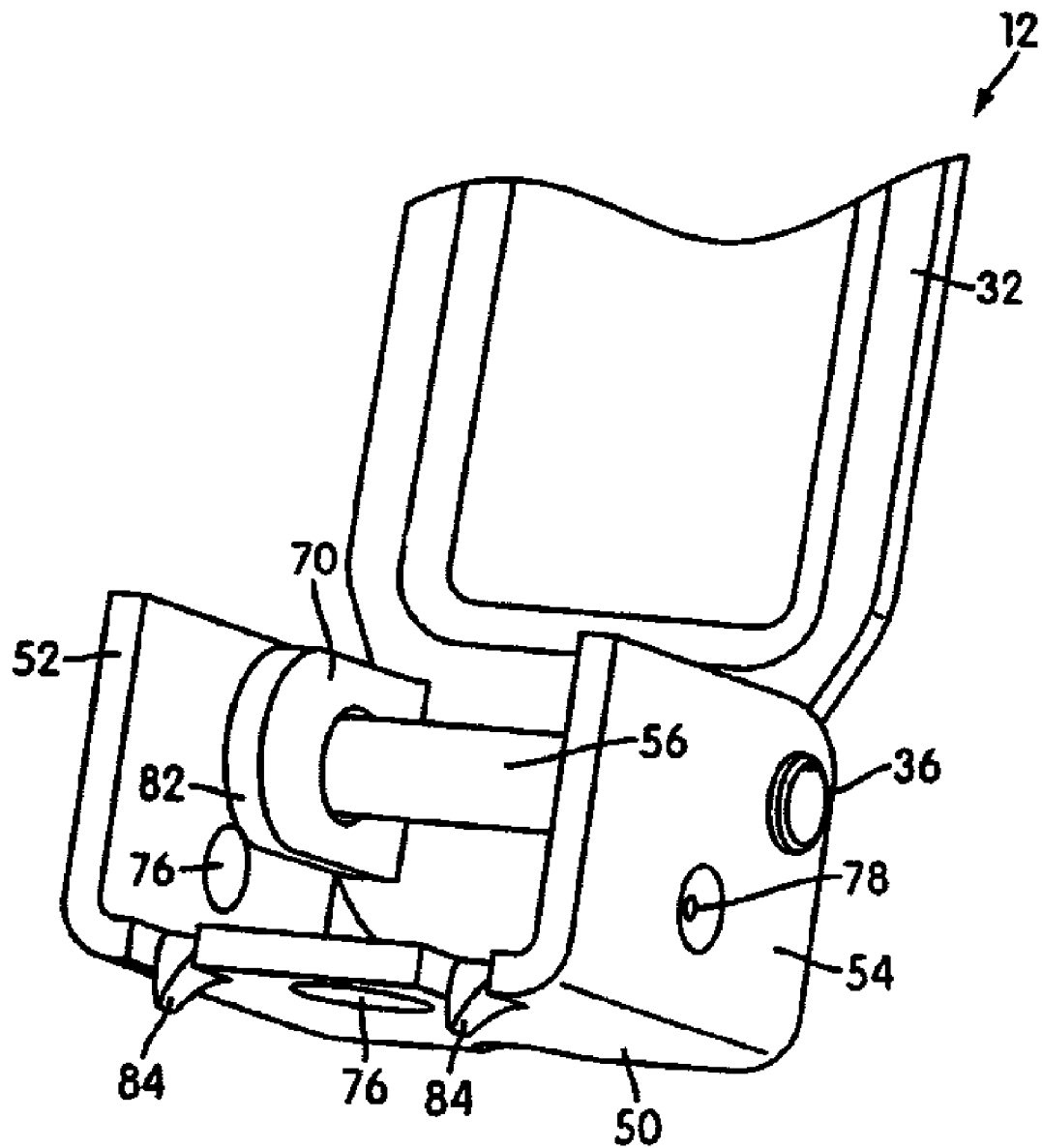
Figure 11:
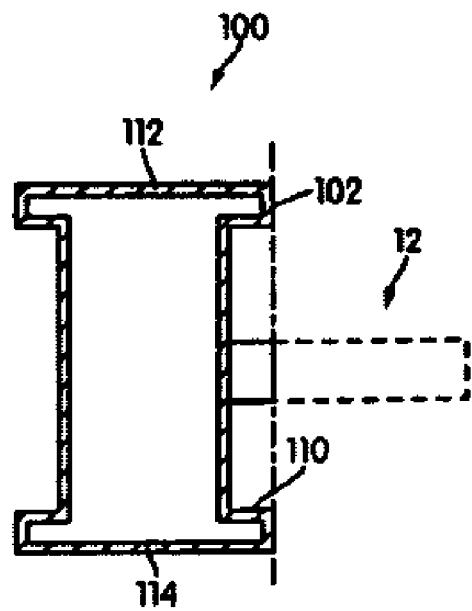
Figure 12:
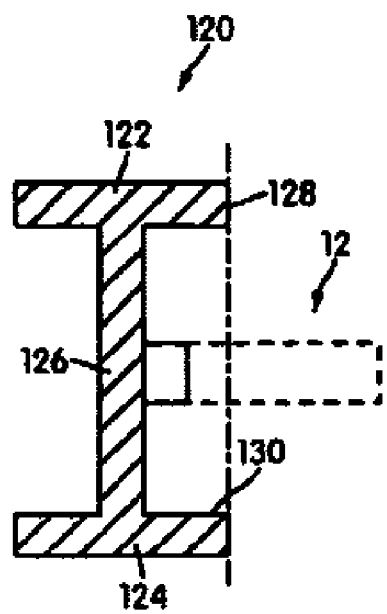
Figure 13:
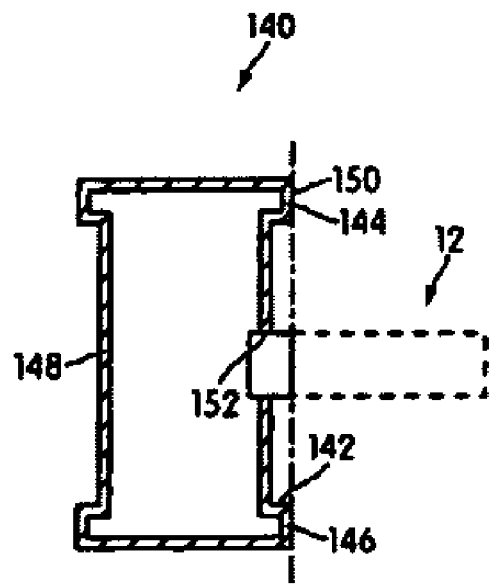

FIGS. 11–13 show the hanger structure 12 in use with various embodiments of levels, indicated at 100, 120, and 140, respectively. In particular, the level 100 has a hollow I-shaped configuration that defines a workpiece contacting surface 102 on a side thereof. The I-shaped configuration forms a longitudinally extending channel 110 in a side of the level 100 providing the surface 102. Accordingly, the workpiece contacting surface 102 is defined by outwardly facing ends of flange portions 112, 114, which are separated by the channel 110. For the level 100 having the above-described configuration, the hanger structure 12 is preferably mounted to the level 100 within the channel 110 thereof so that, when in the retracted position described previously, the hanger structure 12 is disposed flush with or interiorly of the workpiece contacting surface 102. As shown, when the hanger structure 12 is in the extended position thereof, (shown in phantom), the hanger structure 12 extends outwardly past the workpiece contacting surface 102.

It is contemplated that the level 100 may be formed of wood, such as discussed above with reference to level 10, or may be formed of an extruded metal or polymer material. In a case when the level 100 is formed from a metal or polymer material, it may be preferable for the hanger structure 12 to be connected thereto via a fastener (e.g., screw, bolt, rivet, etc.), as discussed above with reference to level 10 and for the retaining structures 84 to be in a form of tabs received within corresponding openings within the level 100 itself.

The level 120 has a generally I-shaped configuration defined by flange portions 122, 124 and a central web portion 126. The flange portions 122, 124 and web portion 126 define a longitudinally extending channel 130. As with the levels 10, 100 described above, the level 120 provides a workpiece contacting surface 128 on a side thereof. The workpiece contacting surface 128 is defined by outwardly facing ends of the flange portions 122, 124. Furthermore, so that the hanger structure 12 is disposed interiorly of or flush with the workpiece contacting surface 128, when in the retracted position thereof, it is preferable for the hanger structure 12 to be connected to the web portion 126 within the channel 130. As shown, when the hanger structure 12 is in the extended position (shown in phantom) the hanger structure 12 extends past the workpiece contacting surface 128.

The level 140 has a hollow, I-shaped configuration, similar to level 100 shown in FIG. 11. However, level 140 defines a channel 142 between flange portions 144, 146 that is shallower than the channel 110 of level 100. In this case, mounting of the hanger structure 12 to web portion 148 may cause the hanger structure 12 to extend outwardly past a workpiece contacting surface 150 of the level 140, even when in the retracted position. Therefore, it may be preferable to provide an aperture 152 within the web portion 148 to effectively recess the hanger structure 12 within the web portion 148 so that the hanger structure 12 is disposed flush with or interiorly of the workpiece contacting surface 150.

It is contemplated that for any of the embodiments of the levels 100, 120, 140 discussed above, the mounting structure 36, as discussed with reference to level 10, may be integrally formed with the corresponding level bodies.

It is also contemplated that the hanger structure 12 described herein may be used with any other tool that may require or benefit from having a hanger structure as described herein. For example, it is contemplated that the hanger structure described herein may be used with hand tools, such as shovels and rakes, or with other carpentry tools, such as hammers.

Although the above description contains specific examples of the present invention, these should not be construed as limiting the scope of the invention, but as merely providing illustrations of some of the presently preferred embodiments of this invention.

What is claimed is:

1. A level comprising:
   an elongated level body including an opposing pair of broad faces and an opposing pair of narrow faces having smaller widths than the broad faces, one of the opposing pair of broad faces defining an exterior workpiece contacting surface thereon;
   at least one of a level and a plumb measuring instrument carried by said level body;
   a hanger structure at least partially received within an outwardly open recess in the exterior workpiece contacting surface of said level body and movably connected to said level body so as to be capable of being moved between a retracted position and a deployed position;
   wherein said hanger structure includes a contacting surface thereon that, when said hanger signature is in said deployed position, is disposed outwardly from said level body to be engageable with a support surface and thereby enable said level to be hung.

2. A level as in claim 1, wherein, when said hanger structure is in said retracted position, said hanger structure is one of flush with and interior of said workpiece contacting surface and, when said hanger structure is disposed in said deployed position, said hanger structure extends substantially outwardly from said level body past said workpiece contacting surface.

3. A level as in claim 1, wherein said hanger structure includes a mounting structure securely mounted to said level body and a body portion pivotably connected at one end thereof to said mounting structure.

4. A level as in claim 3, wherein said mounting structure includes a base portion attached to said level body.

5. A level as in claim 1, wherein said hanger structure includes a mounting structure securely mounted to said level body and a body portion pivotably connected at one end thereof to said mounting structure, said mounting structure being attached to said level body at a bottom portion of said recess.

6. A level as in claim 5, wherein said contacting portion is formed on an end of said body portion opposite said mounting structure.

7. A level as in claim 6, wherein said contacting portion includes a spaced pair of depending finger portions.

8. A level as in claim 1, wherein said hanger structure is formed of steel.

9. A level as in claim 1, wherein said at least one level and/or plumb measuring instrument comprises a fluid containing vial.

10. A level as in claim 1, wherein said at least one level and/or plumb measuring instrument comprises an electronic level and/or plumb measuring instrument.

11. The level of claim 1, wherein said hanger structure is pivotally connected to the level body for pivotal movement about a pivot axis that is parallel to a longitudinal axis of said level body.

12. A level comprising:
    an elongated level body defining an exterior workpiece contacting surface thereon;
    at least once of a level and a plumb measuring instrument carried by said level body;
    a hanger structure at least partially received within an outwardly open recess in said level body and movably connected to said level body so as to be capable of being moved between a retracted position and a deployed position;
    wherein said hanger structure includes a contacting surface thereon that, when said hanger structure is in said deployed position, is disposed outwardly from said level body to be engageable with a support surface and thereby enable said level to be hung, and
    wherein said hanger structure includes a mounting structure securely mounted to said level body and a body portion pivotably connected at one end thereof to said mounting structure, said mounting structure including a base portion attached to said level body and
    a pair of horizontally opposed side portions extending outwardly from said base portion.

13. A level as in claim 12, wherein said body portion is pivotably connected to said side portions of said mounting structure.

14. A level as in claim 13, wherein said body portion includes a pair of opposed leg structures extending generally parallel to said side portions, said leg structures being pivotably connected to said side portions.

15. A level as in claim 14, wherein said leg structures are disposed between said side portions.

16. A level as in claim 14, wherein said side portions have a shaft element extending therebetween, said leg structures having openings extending therethrough configured to receive said shaft element therein.

17. A level as in claim 16, wherein said leg structures are pivotable relative to said side portions about said shaft element.

18. A level as in claim 16, wherein said leg structures and said shaft element are pivotable together relative to said side portions.

19. A level as in claim 16, wherein at least one of said side portions includes an inwardly extending protruding portion positioned thereon relative to a corresponding leg structure configured to abut an edge of said leg structure when said hanger structure is in said retracted position.

20. A level as in claim 19, wherein said protruding portion is positioned on said side portion relative to said corresponding leg structure and is configured to abut an edge of said leg structure when said hanger structure is in said deployed position.

21. A level as in claim 20, wherein said base portion includes an outwardly protruding portion configured to abut an end portion of said body portion when said hanger structure is in said deployed position to thereby prevent further relative movement of said hanger structure past said deployed position.

22. A level as in claim 21, wherein said deployed position of said hanger structure is about 90° with respect to said level body.

23. A level as in claim 21, wherein said side portions of said mounting structure define end portions thereof, said end portions being configured to abut a confronting surface of said body portion when said hanger structure is in said retracted position.

24. A level as in claim 23, wherein said base portion includes at least one retaining structure configured to extend toward said level body and engage therewith.

25. A method of using a level having a level body, comprising:

pivotally moving a hanger structure about a pivot axis that is parallel to a longitudinal axis of the level body from a retracted position to a deployed position, wherein said hanger structure includes a contacting surface thereon disposed outwardly of said level body when said hanger structure is in said deployed position; and hanging said level by engaging said contacting surface with a support surface.

26. A level comprising:

an elongated level body defining an exterior workpiece-contacting surface thereon;

at least one of a level and a plumb measuring instrument carried by said level body;

a hanger structure at least partially received within an outwardly open recess in said level body and movably connected to said level body so as to be capable of being moved between a retracted position and a deployed position:

said hanger structure including a first portion that extends away from said level body when said hanger structure is in said deployed position, and a second portion spaced from and disposed at an angle with respect to said first portion, wherein said second portion of said hanger structure extends into said recess in said level body when said hanger structure is in said retracted position.

27. The level of claim 26, wherein said first portion is between said second portion and the portion of said hangar structure that is movably connected to said level body.

28. The level of claim 27, wherein said second portion comprises a plurality of spaced fingers extending from said first portion.

* * * * *

UNITED STATES PATENT AND TRADEMARK OFFICE
CERTIFICATE OF CORRECTION

PATENT NO.    : 6,796,045 B2
DATED         : September 28, 2004
INVENTOR(S)   : Hallee It is certified that error appears in the above-identified patent and that said Letters Patent is hereby corrected as shown below:

Please replace the informal drawings that are shown for the formal drawings shown on the attached pages:

Signed and Sealed this

Fifteenth Day of March, 2005

JON W. DUDAS
*Director of the United States Patent and Trademark Office*